(12) United States Patent
Oslie et al.

(10) Patent No.: US 11,823,835 B2
(45) Date of Patent: Nov. 21, 2023

(54) ELECTRICAL DEVICE WITH MAGNETIC CONNECTOR

(71) Applicant: KARL STORZ Imaging, Inc., Goleta, CA (US)

(72) Inventors: Larry Oslie, Santa Barbara, CA (US); Christopher Zimmer, Santa Barbara, CA (US); Maxim J. Skender, Ventura, CA (US); Mark Gregory Belding, Goleta, CA (US)

(73) Assignee: KARL STORZ Imaging, Inc., Goleta, CA (US)

( * ) Notice: Subject to any disclaimer, the term of this patent is extended or adjusted under 35 U.S.C. 154(b) by 325 days.

(21) Appl. No.: 17/368,517

(22) Filed: Jul. 6, 2021

(65) Prior Publication Data
US 2023/0009228 A1    Jan. 12, 2023

(51) Int. Cl.
*H01F 7/04* (2006.01)
*H04N 7/18* (2006.01)
*H02J 50/10* (2016.01)
*H04N 23/60* (2023.01)

(52) U.S. Cl.
CPC ............ *H01F 7/04* (2013.01); *H02J 50/10* (2016.02); *H04N 7/183* (2013.01); *H04N 23/60* (2023.01)

(58) Field of Classification Search
CPC  H01F 7/04; H02J 50/10; H04N 23/60; H04N 7/183
USPC .......................................................... 439/346
See application file for complete search history.

(56) References Cited

U.S. PATENT DOCUMENTS

| | | | | |
|---|---|---|---|---|
| 3,995,209 A | * | 11/1976 | Weston | H03H 7/40 439/38 |
| 4,416,268 A | * | 11/1983 | Hagino | A61B 1/00119 600/158 |
| 5,335,662 A | * | 8/1994 | Kimura | G02B 23/2484 600/459 |
| 7,582,056 B2 | * | 9/2009 | Noguchi | A61B 1/00016 600/110 |
| 10,203,493 B2 | * | 2/2019 | Kirma | G02B 23/2484 |
| 10,499,794 B2 | * | 12/2019 | Gilreath | A61B 1/0684 |
| 10,537,236 B2 | * | 1/2020 | Bennett | A61B 1/128 |
| 2011/0127842 A1 | * | 6/2011 | Eriksen | H01F 38/14 307/104 |

(Continued)

FOREIGN PATENT DOCUMENTS

EP    1721568 A1    11/2006
EP    1645219 B1    11/2016

*Primary Examiner* — Alexander Gilman
(74) *Attorney, Agent, or Firm* — David N. Villalpando (57) ABSTRACT

An electrical device, such as a camera controller includes a connector having a first magnetic element and a first cam surface. An electrical housing includes a housing panel having an outer surface configured to receive the connector. A target element is disposed within the electrical housing. The target element includes a second magnetic element. The outer surface includes a second cam surface configured to engage the first cam surface and translate a rotation of the connector into an axial displacement of the connector. In one aspect, a target positioning member is configured to position the target element into the first position when the connector is removed from the outer surface. The targeting positioning member is further configured to position the target element into the second position when the first cam surface engages the second cam surface.

30 Claims, 6 Drawing Sheets

(56) References Cited

U.S. PATENT DOCUMENTS

| | | | |
|---|---|---|---|
| 2013/0170258 A1* | 7/2013 | Calvin | H01F 5/04 |
| | | | 363/64 |
| 2015/0091388 A1* | 4/2015 | Golko | H01R 13/6205 |
| | | | 307/104 |
| 2015/0093922 A1* | 4/2015 | Bosscher | H02J 50/10 |
| | | | 439/39 |
| 2015/0102879 A1* | 4/2015 | Jacobs | H01F 7/0247 |
| | | | 335/294 |
| 2015/0221432 A1* | 8/2015 | Zhou | H01F 27/40 |
| | | | 361/679.01 |
| 2016/0127643 A1* | 5/2016 | Huerta | H01F 7/0252 |
| | | | 439/8 |
| 2017/0070078 A1* | 3/2017 | Hwang | H02J 7/34 |
| 2020/0187758 A1* | 6/2020 | Duckett, III | A61B 1/00114 |
| 2023/0009228 A1* | 1/2023 | Oslie | H01F 38/14 |

* cited by examiner

ELECTRICAL DEVICE WITH MAGNETIC CONNECTOR

The present disclosure relates generally to the field of electrical devices with a magnetically attached connector and more particularly to a camera controller with a magnetically attached connector.

BACKGROUND

An exemplary electrical device, such as a camera controller, includes an interface configured to attached to a connector. The connector may be coupled to a device, such as a medical imaging system and transmits signals to and from the camera controller. The camera controller includes electrical components configured to process the signals to provide an output such as a video image.

Currently, the connectors are attached to the electrical device using mechanical means, to include male and female terminal blades, a USB connection or magnetic coupling. The connector may be inserted into a recessed receptacle of the electrical device. To ensure that the attachment of the connector to the housing panel can withstand an incidental load which may disconnect the connector from the housing panel, a minimum of 5-10 lbs. of pullout force is often needed to remove the connector from the device. As such, detaching the connector may require significant strength. Incidental side loads may be countered by the interaction of the connector with the recessed receptacle.

Metallic terminal blades and plastic or rubber connectors wear down over time and become less effective at providing both good electrical connections and sufficient resistance to axial and side load pull-out forces. Accordingly, it remains desirable to have an electrical device configured to facilitate the purposeful detachment of the connector from the electrical device. Further, it is desirable to have an electrical device configured to attach a connector for power and data transmission while isolating the connector and an associated medical device from potential electrical hazards due to unexpected surges from the electrical device.

SUMMARY

One aspect of the disclosure provides an electrical device for transmitting, receiving and processing signals. The electrical device includes electrical components for receiving, transmitting and processing the signals. The electrical device includes a connector having a first magnetic element and a first engagement surface. The first engagement surface includes a first cam surface. The electrical device further includes an electrical housing configured to hold the electrical components. The electrical housing includes a housing panel. The housing panel includes an outer surface configured to receive the connector and an inner surface facing an interior of the electrical housing. The outer surface includes a second cam surface configured to engage the first engagement surface and the first cam surface.

A target element is disposed within the electrical housing. The target element includes a second magnetic element, wherein the first cam surface and the second cam surface are configured to translate a rotation between the first cam surface and the second cam surface into an axial displacement of the connector with respect to the housing panel.

In one aspect, the electrical housing further includes a target positioning member. The target positioning member is configured to position the target element into the first position when the connector is removed from the outer surface. The targeting positioning member is further configured to position the target element into the second position when the first cam surface engages the second cam surface.

In one aspect, the electrical housing further includes a first mount. The targeting positioning member couples the first mount to the second magnet. The targeting positioning member is configured to dampen the movement of the second magnetic element towards the first magnetic element. The target positioning member may be a damping device.

In one aspect, the damping is a pneumatic piston having a damping compression value that is lower than a damping rebound value. In yet another aspect, the target positioning member is a biasing member.

The electrical device may further include a retaining mechanism mechanically. The retaining mechanism is coupled to the second magnetic element and is configured to releasably hold the second magnetic element in the first position.

In another aspect, the electrical device further includes an actuator configured to actuate the retaining mechanism between a release position and an engaged position.

In another aspect, the electrical device further includes a receiver configured to receive a command signal, wherein the actuator processes the command signal so as to actuate the retaining mechanism. In such an aspect, the connector may include a wireless transmitter configured to transmit the command signal. The wireless transmitter may be a Radio-Frequency Identification (RFID) transmitter. The actuator may be configured to process a strength of the command signal to actuate the retaining mechanism into the release position and the engage position.

A camera controller is also provided. The camera controller is configured to transmit, receive and process signals to perform video image processing. The camera controller includes electrical components for receiving, transmitting and processing the signals. The camera controller includes a connector having a first magnetic element and a first engagement surface. The first engagement surface includes a first cam surface. The camera controller includes an electrical housing configured to hold the electrical components. The electrical housing includes a housing panel. The housing panel includes an outer surface and an inner surface. The outer surface is configured to receive the connector. The inner surface faces an interior of the electrical housing. The outer surface includes a second cam surface. The second cam surface is configured to engage the first engagement surface and the first cam surface.

The camera controller includes a target element disposed within the electrical housing. The target element includes a second magnetic element. The second magnetic element is movable from a first position to a second position. In the first position, the second magnetic element is further from the inner surface relative to the second position. In the second position, the second magnetic element is closer to the inner surface relative to the first position. The first cam surface and the second cam surface are configured to translate a rotation between the first cam surface and the second cam surface into an axial displacement of the connector with respect to the housing panel.

In one aspect, the camera controller further includes a target positioning member configured to position the target element into the first position when the connector is removed from the outer surface and that positions the target element into the second position when the first cam surface engages the second cam surface.

In one aspect, the target positioning member is a pneumatic piston having a damping compression value that is lower than a damping rebound value. In another aspect, the target positioning member is a biasing member.

In yet another aspect, the camera controller further includes a retaining mechanism mechanically coupled to the second magnetic element and configured to releasably hold the second magnetic element in the first position.

In another aspect, the camera controller further includes an actuator configured to actuate the retaining mechanism between a release position and an engaged position.

In another aspect, the camera controller further includes a receiver configured to receive a command signal. The actuator processes the command signal so as to actuate the retaining mechanism. In such an aspect, the connector may include a wireless transmitter configured to transmit the command signal. In one aspect of a wireless transmitter, the wireless transmitter is an RFID transmitter. The actuator may process a strength of the command signal to actuate the retaining mechanism into the release position and the engage position.

In one aspect, the first cam surface is an indent and the second cam surface is a protrusion. The indent of the first cam surface may be concave and the second cam surface may be convex.

Accordingly, provided herein is an electrical device, such as a camera controller configured to reduce a magnetic attraction between first and second magnetic elements by a simple rotation. Further, the second magnetic element is positioned to be recessed from the housing panel when the connector is disengaged, thus minimizing the attractive magnetic force of the second magnetic element so as to reduce an unwanted attachment of a metallic element to the housing panel.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION

One aspect of the disclosure provides an electrical device, such as a camera controller, for transmitting, receiving and processing signals. The electrical device includes a connector having a first magnetic element and a first engagement surface. The first engagement surface includes a first cam surface. The electrical device further includes an electrical housing having a housing panel. The housing panel includes an outer surface configured to receive the connector and an inner surface facing an interior of the electrical housing. The outer surface includes a second cam surface configured to engage the first engagement surface and the first cam surface.

A target element is disposed within the electrical housing. The target element includes a second magnetic element. The second magnetic element is movable from a first position to a second position. In the first position, the second magnetic element is further from the inner surface of the housing panel relative to the second position. In the second position the second magnet is closer to the inner surface relative to the first position. The first cam surface and the second cam surface are configured to translate a rotation between the first cam surface and the second cam surface into an axial displacement of the connector with respect to the housing panel.

In one aspect, the electrical housing further includes a target positioning member. The target positioning member is configured to position the target element into the first position when the connector is removed from the outer surface. The targeting positioning member is further configured to position the target element into the second position when the first cam surface engages the second cam surface.

Accordingly, the electrical device is configured to reduce a magnetic attraction between first and second magnetic elements by a simple rotation of the connector. Further, the second magnetic element is positioned to be recessed from the housing panel when the connector is disengaged, thus minimizing the attractive magnetic force of the second magnetic element so as to reduce an unwanted attachment of a metallic element to the housing panel.

First Embodiment

With reference now to the Figures, an electrical device 10 for transmitting, receiving and processing signals is provided. With reference first to FIG. 1 and FIGS. 2a-2d a first embodiment of the electrical device 10 is provided. In one aspect, the electrical device 10 is a camera controller 200. The electrical device 10 includes an electrical housing 12 configured to hold electrical components (not shown) for receiving, transmitting and processing the signals. The electrical housing 12 is illustratively shown as being generally cuboidal; however, it should be appreciated that the shape of the electrical housing 12 may differ from what is shown in the Figures without deviating from the scope of the appended claims.

Figure 1:
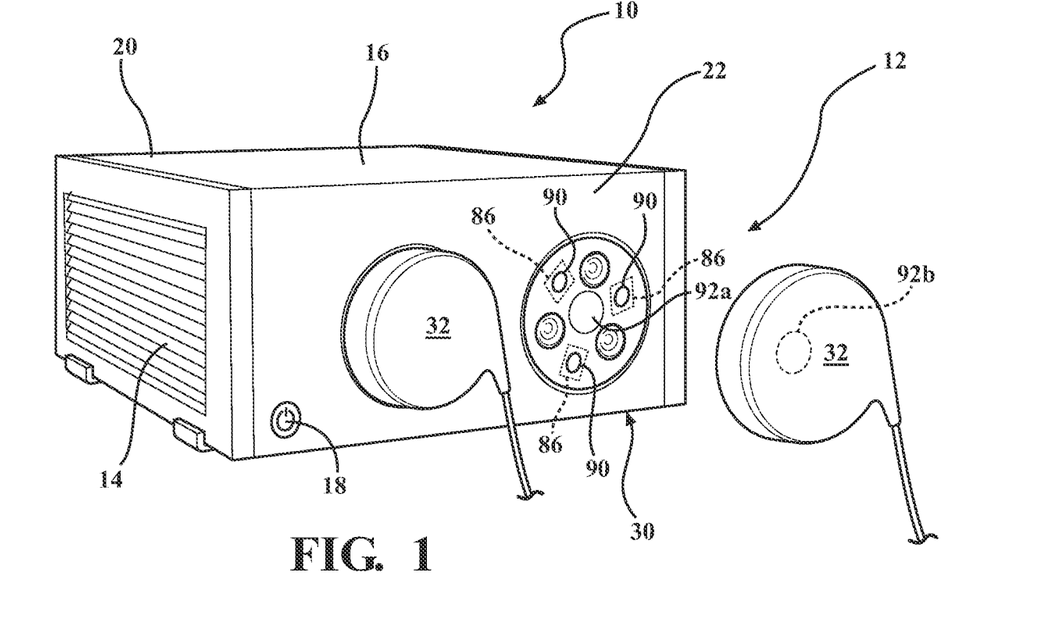
FIG. 1 is an exemplary view of an electrical device according to one or more aspects described herein.

The electrical housing 12 includes a pair of side walls 14, a top wall 16, a bottom wall 18, a back wall 20 and a housing panel 22 which forms a front of the electrical housing 12. The side walls 14, top wall 16, back wall 20 and the housing panel 22 are connected so as to define an interior space 24. The housing panel 22 includes an outer surface 26 and an inner surface 28. The outer surface 26 is exposed and accessible to a user and the inner surface 28 is disposed within the interior space 24 of the electrical housing 12. The outer surface 26 of the housing panel 22 includes an interface 30 and in some examples, one or more touch buttons such as a power button 31. The electrical device 10 includes additional features not shown for processing image and video provided by an imaging device such as an image sensor of a camera system.

The electrical device 10 includes a connector 32. The connector 32 may be attached to a device such as a camera head or an endoscope with an integrated image sensor and is configured to transmit signals, such as a video signal, which are processed by the electrical device 10. The connector 32 includes a first magnetic element 34 and a first engagement surface 36. The first magnetic element 34 is configured to be attracted to a magnetic force. In one aspect, the first magnetic element 34 is a magnet. In another aspect, the first magnetic element 34 is a plate made of a magnetically attracted material, such as iron. In some examples, a ferrous plate may be advantageous over a magnet to reduce the likelihood of inadvertent attraction to metallic instruments when the connector 32 is not connected to the device 10. For example, in an operative setting, there may be other magnetic objects such as hand instruments, carts, lighting, etc. which would be attracted to the magnet of the connector 32.

The connector 32 is configured to attach to the housing panel 22. In particular, the connector 32 is configured to attach to the interface 30 of the housing panel 22. FIG. 1 shows an aspect where the electrical device 10 includes a pair of connectors 32 and the housing panel 22 includes a pair of interfaces 30. It should be appreciated that the number of connectors 32 and interfaces 30 are not limiting to the scope of the appended claims.

The first engagement surface 36 includes a first cam surface 38. The first engagement surface 36 is substantially planar in areas with exception of the first cam surface 38. Likewise, the outer surface 26 of the housing panel 22 includes a second cam surface 40 configured to engage the first engagement surface 36 and the first cam surface 38. Likewise, the outer surface 26 is substantially planar in areas with the exception of the second cam surface 40. The first cam surface 38 and the second cam surface 40 are configured to be nested with respect to each other so as to have the planar surface of the first engagement surface 36 and the outer surface 26 adjacent with each other, with approximately a 0.5 mm-1 mm gap between.

The first cam surface 38 and the second cam surface 40 are nested such that rotation of the connector 32 relative to the outer surface 26 causes the first cam surface 38 to push against the second cam surface 40, translating the rotational movement into an axial displacement of the connector 32 with respect to the housing panel 22. Accordingly, it should be appreciated that in instances where there are multiple connectors 32 and multiple interfaces 30, the first cam surface 38 of the connectors 32 may be different from each other. Likewise, the second cam surface 40 of the interfaces 30 may be different from each other, but the first cam surface 38 and the second cam surface 40 are dimensioned so as to nest a connector 32 with a corresponding interface 30 of the outer surface such that the surface of the connector 32. Such an embodiment may be desirable when connecting connectors 32 which are coupled to different electrical devices so ensure that the signals from the electrical devices are properly processed.

A target element 42 is disposed within the interior space 24 of the electrical housing 12. The target element 42 includes a second magnetic element 44. The second magnetic element 44 is configured to generate a magnetic force so as to be attracted to the first magnetic element 34. Accordingly, a rotation of the connector 32 axially displaces the second magnetic element 44 from the first magnetic element 34 so as to weaken the magnetic attraction between the first magnetic element 34 and the second magnetic element 44 and facilitate the removal of the connector 32.

With reference now to FIGS. 2a-2d, the electrical device 10 may further include a target positioning member 46. The target positioning member 46 is disposed within the interior space 24 of the electrical housing 12. The target positioning member 46 is configured to position the target element 42 between a first position and a second position. In the first position, the second magnetic element 44 is further from the inner surface 28 of the housing panel 22 relative to the second position. In the second position the second magnetic element 44 is closer to the inner surface 28 relative to the first position. The target positioning member 46 is configured to move the second magnetic element 44 into the first position when the connector 32 is removed from the outer surface 26. The target positioning member 46 is further configured to allow the target element 42 to move into the second position when the first cam surface 38 engages the second cam surface 40.

The target positioning member 46 may be a mechanical device that does not require electrical power for operation or an electro-mechanical device which is powered by electrical power. For illustrative purposes, the target positioning member 46 is shown as being a mechanical device; however, it should be appreciated that the target positioning member 46 may be an electro-mechanical device, such as a servo-motor actuating a worm gear. Any target positioning member 46 currently known or later developed may be modified for use herein.

In one aspect, the electrical housing 12 further includes a first mount 48. The first mount 48 is illustratively shown as being a planar and rigid member fixedly mounted to the bottom wall 18 of the electrical housing 12. The first mount 48 may be formed of a rigid and durable material that is not magnetic, such as polymer, ceramic or the like. The target positioning member 46 is configured to elastically couple the first mount 48 to the second magnetic element 44. Although a mount 48 is shown, any structure suitable for coupling features within the interior space 24 of the housing 12 may be used to couple the target positioning member 46 to the housing 12 or other features therein. The target positioning member 46 is configured to dampen the movement of the second magnetic element 44 towards the first magnetic element 34 and return the second magnetic element 44 to the first position when the connector 32 is removed.

In one aspect, the target positioning member 46 may be a damping device 50 configured to slow the movement of the second magnetic element 44 from the first position to the second position so as to prevent the second magnetic element 44 from being damaged. Any damping device 50 currently known or later developed may be modified for use herein. For instance, the damping device 50 may include a pneumatic piston having a damping compression value that is lower than a damping rebound value. In this case, the target positioning member 46 may move the second magnetic element more quickly to the second position than the first position.

In yet another aspect, the target positioning member 46 may include a biasing member 52, such as a coil spring. In yet another aspect, the target positioning member 46 includes both the damping device 50 and the biasing member 52. In such an aspect, the damping device 50 and the biasing member 52 cooperate to dampen the movement of the second magnetic element 44 towards the inner surface 28 as the first magnetic element 34 approaches and engages the device 10. The biasing member 52 and the damping device 50 are further configured to return the second magnetic element 44 to the first position when the connector 32 is removed. In this manner, the second magnetic element 44 is prevented from rapidly moving towards the housing panel 22 and the likelihood of inadvertent attraction to other magnetic options is reduced.

Figure 2A:
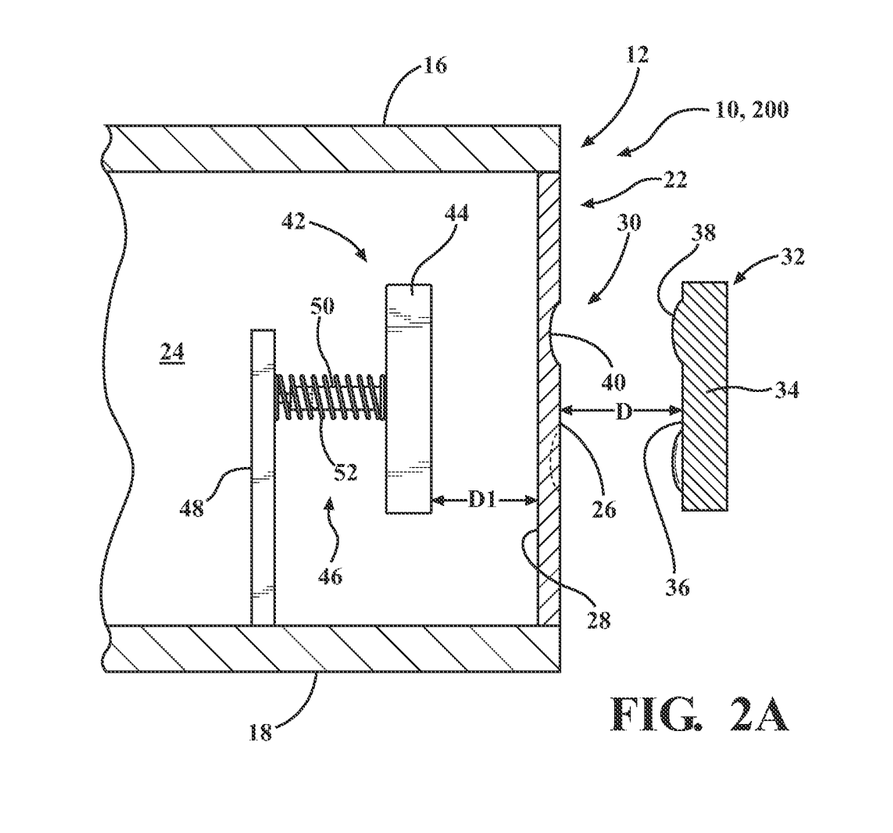
FIG. 2a is a cross-sectional view of the electrical device according to a first embodiment described herein.

An operation of the electrical device 10 according to the first embodiment is described with respect to FIGS. 2a-2d. With reference first to FIG. 2a, the connector 32 is detached from the electrical housing 12 and the target element 42 is in the first position. The target positioning member 46 is fixed on one end to the first mount 48 and the other end of the target positioning member 46 is fixed to the target element 42. The connector 32 is displaced far enough from the electrical housing 12 wherein the magnetic attraction of the target element 42 and the connector 32 do not pull the target element 42 and the connector 32 towards each other. For example, a distance "D" as shown in FIG. 2A, may separate the first engagement surface 36 from the outer surface 26. At this distance, the magnetic attraction is insufficient to overcome the target positioning member 46 and the target element 42 remains separated from the inner surface 28 by a distance "D1".

As illustrated, in the first position the target positioning member 46 is in a relaxed state. In one aspect, the target positioning member 46 includes the damping device 50 and the biasing member 52. The damping device 50 is illustratively shown as being a pneumatic piston and the biasing member 52 is illustratively shown as a coil spring. The pneumatic piston is disposed within the coil spring. The target element 42 is recessed from the inner surface 28 of the housing panel 22. However, it should be appreciated that the targeting positioning member 46 may include one or both of the damping device 50 and the biasing member 52. As the distance "D" decreases, the magnetic attraction increases and may begin to overcome the target positioning member 46 and the distance between the target element 42 and the inner surface 28 may begin to decrease from the distance D1.

Figure 2B:
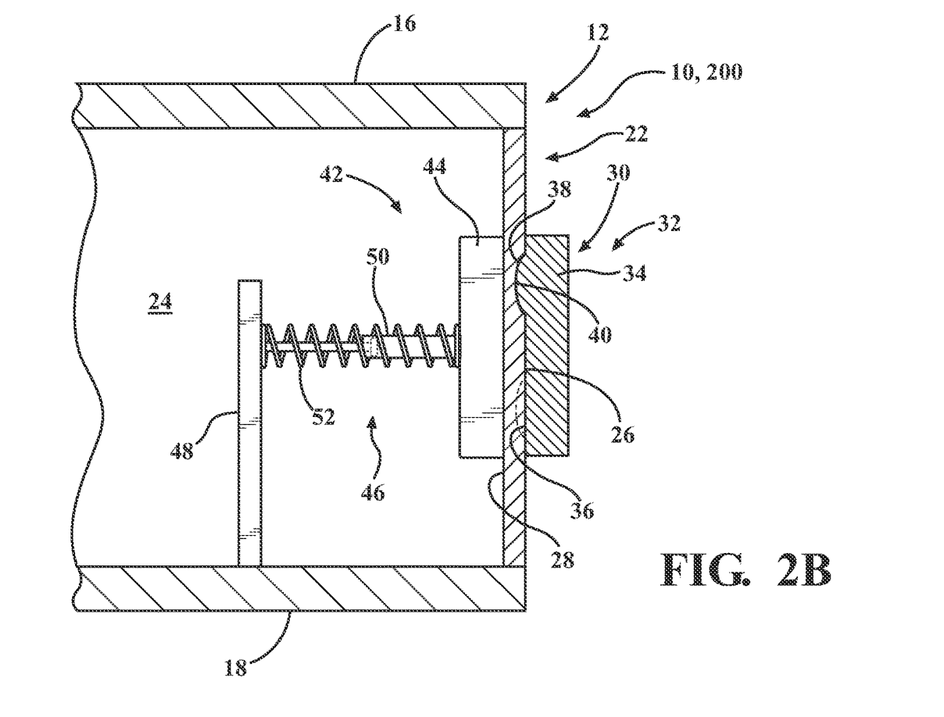
FIG. 2b is a view of FIG. 2a showing the target element is the second position.

With reference now to FIG. 2b, the connector 32 is engaged with the outer surface 26 of the housing panel 22. In particular, the first engagement surface 36 is mounted to the interface 30 of the outer surface 26 of the housing panel 22, wherein the first cam surface 38 of the connector 32 is seated into the second cam surface 40 of the outer surface 26 of the housing panel 22. For illustrative purposes, the first cam surface 38 is shown as being a convex shape which generally forms a bead and the second cam surface 40 is a concave surface configured to receive the first cam surface 38 so as to place the first engagement surface 36 of the connector 32 flush with the outer surface 26 of the housing panel 22. However, it should be appreciated that the first cam surface 38 may be concave and the second cam surface 40 may be convex.

When the first cam surface 38 is seated within the second cam surface 40, the proximity of the first magnetic element 34 with respect to the second magnetic element 44 is close enough to magnetically attract the first magnetic element 34 and the second magnetic element 44 to each other. For example, when the connector 32 initially engages the outer surface 26, the magnetic attraction may be a first magnetic level sufficient to hold the connector 32 in place as the target 42 advances towards the housing panel 22. The first magnetic level may also be sufficient to overcome the target positioning member 46 such that the target element 42 begins to move from the first position to the second position. As the target element 42 draws closer to the housing panel, the magnetic attraction between the first magnetic element 34 and the second magnetic element 44 increases and is configured to be strong enough to overcome the extension force of the biasing member 52 and the damping rebound value of the damping device 50 so as to move the second magnetic element 44 from the first position to the second position. Once in the second position, the magnetic attraction may be a second magnetic level greater than the first magnetic level.

Figure 2C:
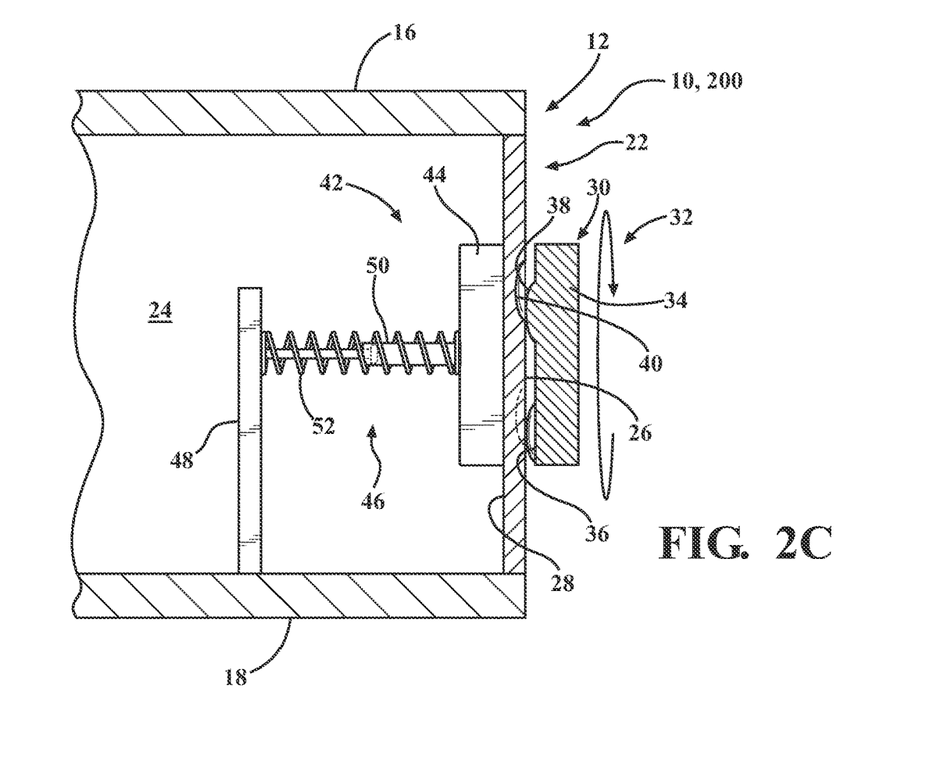
FIG. 2c is a view of FIG. 2b, showing the connector rotated.

The second magnetic level includes a magnetic attraction that makes it more difficult to pull the connector 32 away from the housing panel, particularly in an axial direction perpendicular to the housing panel 22. This may be referred to as an axially pull-out force. With reference now to FIG. 2c, the connector 32 is shown as being rotated due to an applied torque. The size of the connector 32 may result in an increase amount of torque which translates into an increased axially pull-out force. In such an aspect, the first cam surface 38 engages the second cam surface 40 so as to displace the connector 32 away from the housing panel 22. The displacement of the connector 32 from the housing panel 22, increases the distance D between the first magnetic element 34 and the second magnetic element 44 which in turn reduces the magnetic pull and facilitates the eventual complete removal of the connector 32. In particular, the displacement of the first magnetic element 34 with respect to the second magnetic element 44 decreases the pull out force. However, the pull-out force when the first cam surface 38 is engaged with the second cam surface 40 is larger than the force required to twist the connector 32. Thus, the user may twist the connector 32 but not necessarily pull the connector 32 away from the interface 30. The pull-out force decreases exponentially in relationship to the displacement of the first magnetic element 34 with respect to the second magnetic element 44. As such, the pull-out force when the connector 32 is twisted and displaced from the interface 30 by a distance of the height of the second cam surface decreases exponentially from the pull-out force when the connector 32 is engaged with the interface 30 as shown in FIG. 2B, as such the pull-out force of the connector 32 shown in FIG. 2C is significantly smaller than the pull-out force of the connector 32 shown in FIG. 2B, making it easier for the user to decouple the connector 32.

Figure 2D:
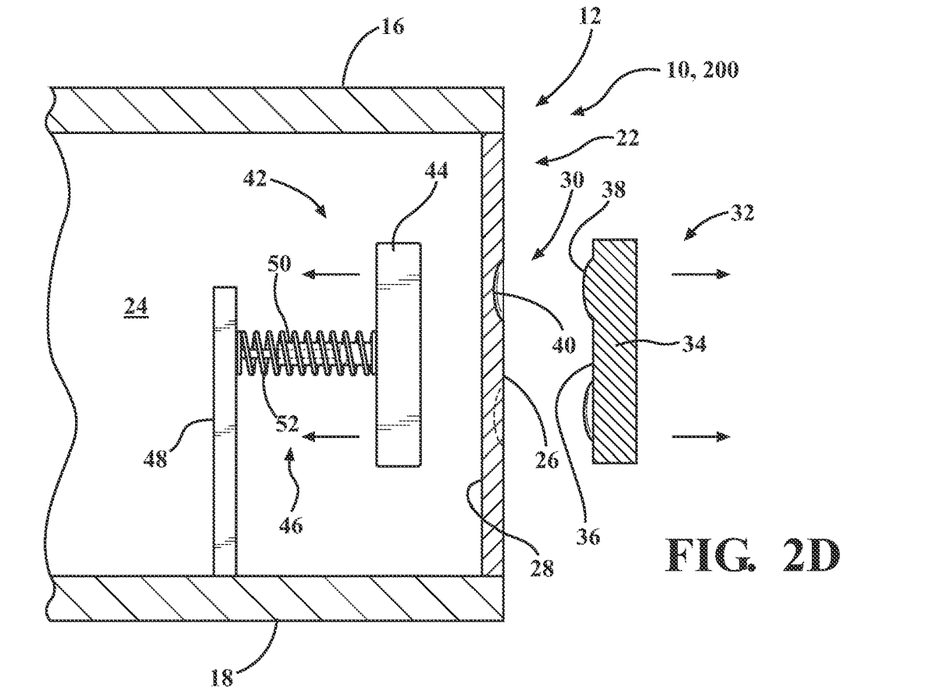
FIG. 2d is a view of FIG. 2c showing the target plate moving to the first position.

With reference now to FIG. 2d, the connector 32 is removed from the electrical housing 12. The connector 32 is displaced such that there is no magnetic pull between the first magnetic element 34 and the second magnetic element 44. As such, the target positioning element 46 is configured to move the target element 42 to the first position. In particular, the biasing member 52 is returned to its natural state, pulling the target element 42 to the first position. The biasing member 52 has a return force, a force which is opposite of its expansion force, that is sufficient to bring the damping device 50 to a compressed state as shown in FIG. 2a. In the first position, the second magnetic element 44 is recessed with respect to the housing panel 22, and thus its magnetic pull is reduced, and the instance of metallic objects being attracted to the housing panel 22 is reduced.

Second Embodiment

With reference now to FIGS. 3a-3e, a second embodiment of the electrical device 10 is provided. In one aspect, the electrical device 10 is a camera controller 200. In the second embodiment, like elements are referenced by like numbers increased by 100. As shown in FIGS. 3a-3e, the electrical device 110 includes the same features as set forth in the first embodiment. In the second embodiment, the electrical device 110 further includes a retaining mechanism 54. The retaining mechanism 54 is coupled to the second magnetic element 144. The retaining mechanism 54 is configured to releasably hold the target element 142 in the first position. Any retaining mechanism 54 currently known or later developed may by modified for use herein, illustratively including a mechanical or electro-mechanical device. For illustrative purposes, the retaining mechanism 54 is shown as being an electro-mechanical device which utilizes electric power to hold and release the target element 142. However, it should be appreciated that the retaining mechanism 54 may be configured to hold and release the target element 42 using mechanical levers, a gear worm, a servo motor, or the like.

In one aspect, the retaining mechanism 54 includes an arm 56 that is mounted to a second mount 58. The second mount 58 is formed of a rigid and durable material that is not magnetic, such as polymer, ceramic or the like. In one aspect, the second mount 58 is fixed to an inner surface of the top wall 116 of the electrical housing 112 and extends downwardly into the interior space 124. The second mount 58 is recessed inwardly with respect to the housing panel 122. In particular, the second mount 58 is recessed so as to minimize a magnetic pull of the target element 142.

In one aspect, the electrical device 110 may further include a stop 60. The stop 60 may be fixed to the bottom wall 118 of the electrical housing 112 and is positioned so as to prevent the target element 142 from moving past the first position, the stop 60 may be positioned forward of the first mount 148 so as to be disposed between the first mount 148 and the housing panel 122.

In another aspect, the retaining mechanism 54 may further include an actuator 62. The actuator 62 is configured to actuate the retaining mechanism 54 between a release position and an engaged position. Any actuator 62 currently known and used or later develop may be modified for use herein, illustratively including a servo motor. The actuator 62 may be actuated by a command signal which moves the arm 56 between the release position and the engaged position. In other words, the actuator 62 positions the arm 56 so as to release and hold the target element 42. In one aspect, the arm 56 may be extended and retracted so as to assume a respective engaged position and release position. It should be appreciated that the retaining mechanism 54 may be modified without deviating from the scope of the appended claims.

In another aspect, the retaining mechanism 54 further includes a receiver 64 configured to receive a command signal. Preferably, the receiver 64 is a wireless receiver and is disposed within the interior space 124 of the electrical housing 112. The receiver 64 is in communication with the actuator 62. The actuator 62 processes the command signal so as to actuate the retaining mechanism 54.

In such an aspect, the connector 132 may include a wireless transmitter 66 configured to transmit the command signal. The wireless transmitter 66 may be an RFID transmitter. The RFID transmitter may be configured to continuously transmit the command signal. Preferably, the wireless transmitter 66 is integrated into the connector 132 and may be disposed on a back surface of the first magnetic element 134, or may be embedded within the first magnetic element 134 as shown in the Figures. The actuator 62 may be configured to process a strength of the command signal to actuate the retaining mechanism 54 into the release position and the engage position. The strength of the command signal may be based upon a distance of the connector 132 with respect to the wireless transmitter 66.

Figure 3A:
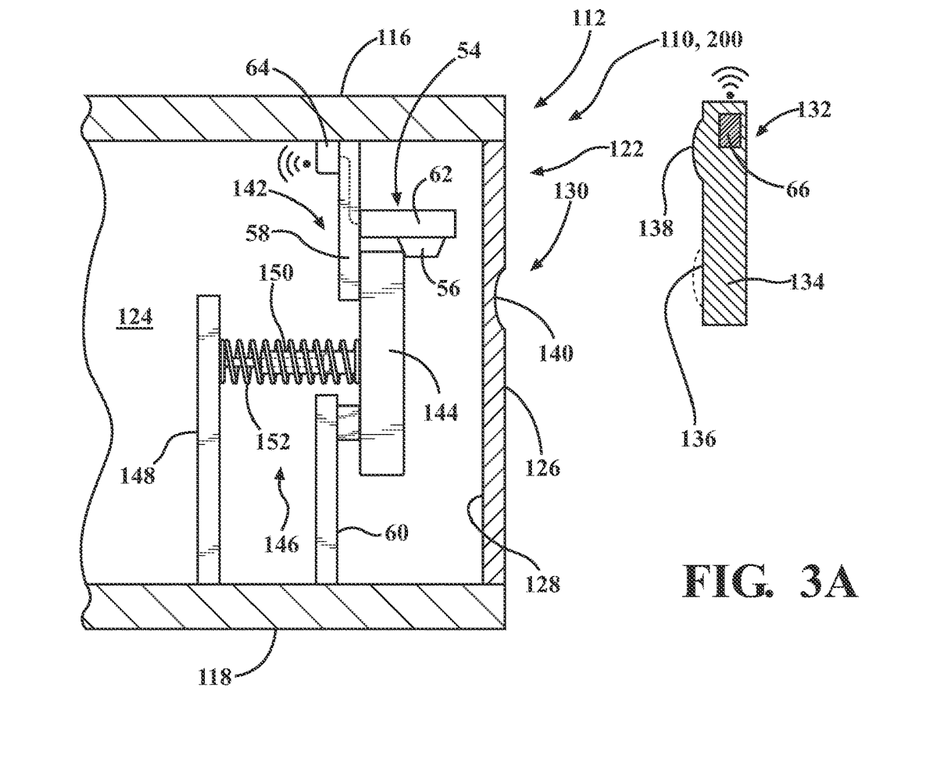
FIG. 3a is a cross-sectional view of the electrical device in according to a second embodiment described herein.

With reference again to FIGS. 3a-3e an operation of the electrical device 110 in accordance with the second embodiment is provided. FIG. 3a shows the target element 142 disposed in the first position, wherein the target element 142 is seated against the stop 60. The retaining mechanism 54 holds the target element 142 in the first position. For illustrative purposes, the retaining mechanism 54 is shown as an electro-mechanical system, for example including a servo motor with an armature. As an example, the arm 56 of the retaining mechanism 54 engages the upper edge of the target element 142. In the first position, the target positioning member 146 may be in a neutral state wherein no forces are exerted on the target element 142. Alternatively, the target positioning member 146 may be configured to exert an expansion force which urges the target element 142 towards the second position.

Figure 3B:
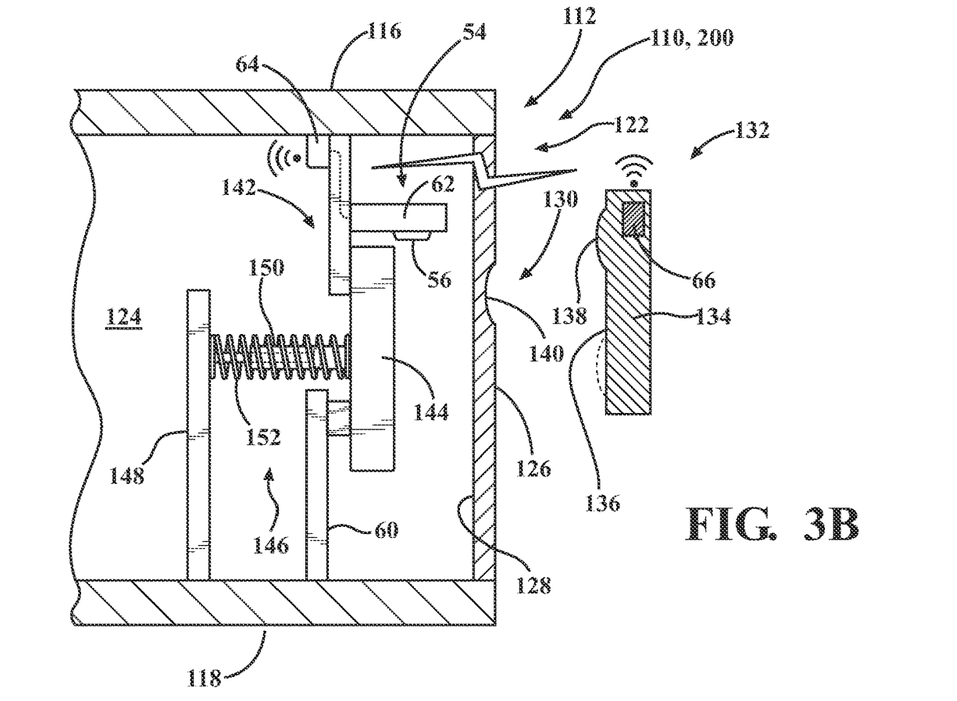
FIG. 3b is a view of FIG. 3a showing the target element moving to the second position.

With reference now to FIG. 3b, the connector 132 is brought into closer proximity to the electrical housing 112 relative to what is shown in FIG. 3a. The receiver 64 receives a command signal from the transmitter 66 of the connector 132. The command signal is processed by the actuator 62 which moves the arm 56 into an open position so as to be clear of the path of travel of the target element 42. It should be appreciated that the actuator 62 may process a strength of the command signal. In such a manner, the actuator 62 may not necessarily open the arm 56 upon a detection of the command signal transmitted from the transmitter 66 coupled to the connector 132, but a location of the connector 132 which is indicative of an intention to couple the connector 132 to the interface 130.

As shown in FIG. 3a, the connector 132 is further away from the electrical housing 112 relative to FIG. 3b. For illustrative purposes, it may be assumed that the receiver 64 is within range of the transmitter 66 to receive the command signal, but the strength of the command signal is not sufficient and thus the retaining mechanism 54 remains in a closed position. In FIG. 3b, the connector 132 is brought closer to the electrical housing 112, and the strength of the command signal is sufficient to cause the actuator 62 to open the arm 56.

Figure 3C:
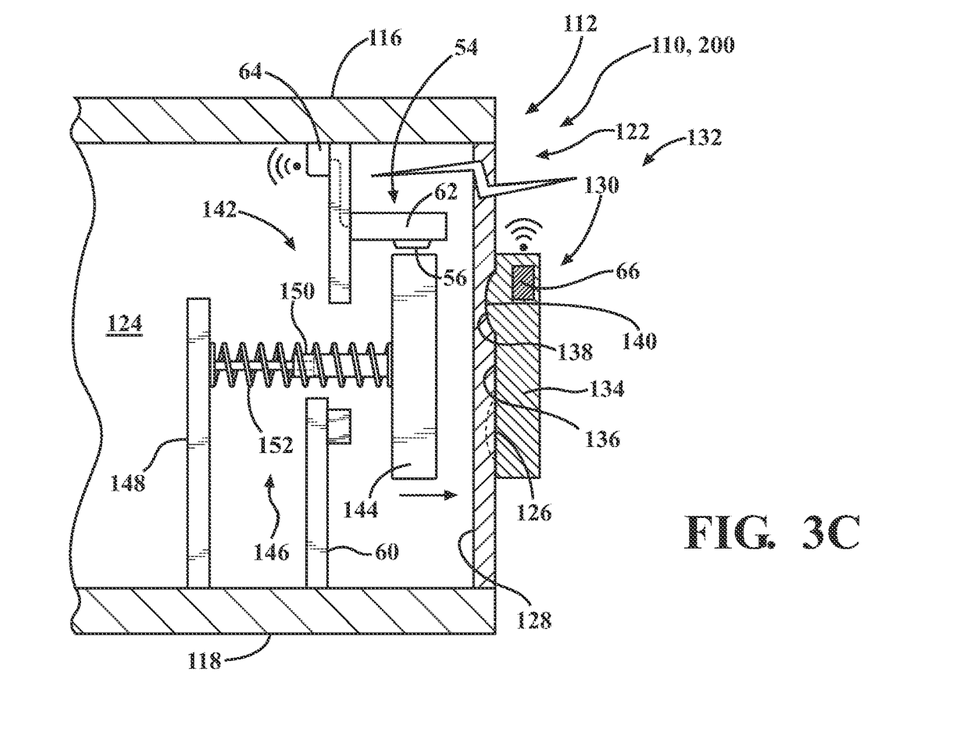
FIG. 3c is a view of FIG. 3b showing the first cam surface engaged with the second cam surface.
Figure 3D:
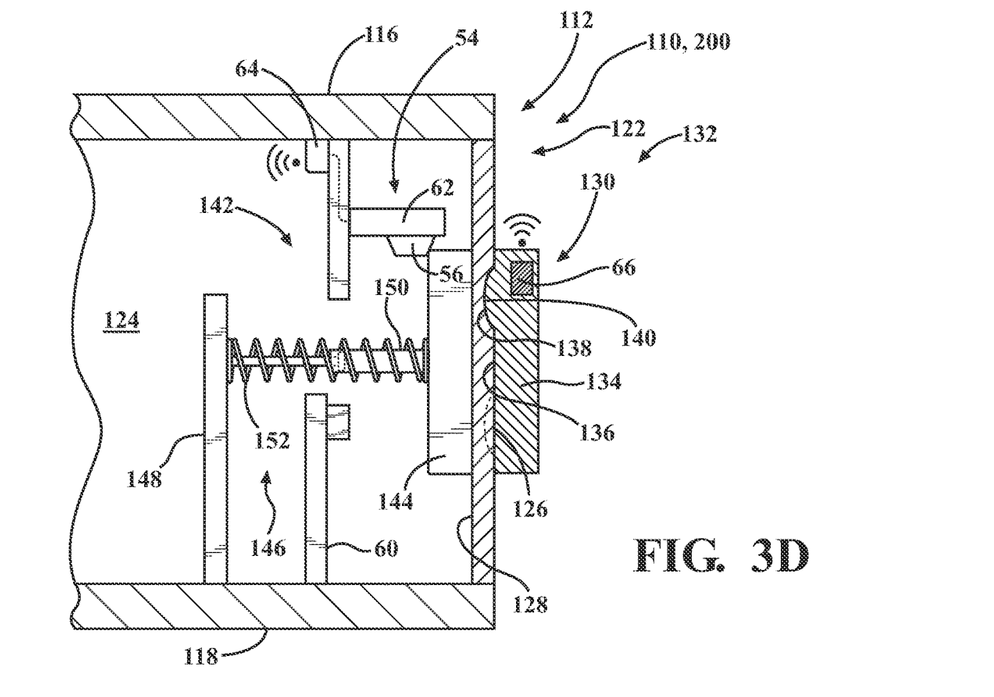
FIG. 3d is a view of FIG. 3c showing the target element in the second position.

FIG. 3c shows the connector 132 seated to the outer surface 126 of the housing panel 122. The first cam surface 138 is fully seated within the second cam surface 140 and the outer surface 126 of the housing panel 122 is flush with the first engagement surface 136 of the connector 132. In the first position, the target element 142 is positioned close enough to the first magnetic element 134 such that the magnetic pull is sufficient to move the target element 142 to the second position. As the arm 56 of the retaining mechanism 54 is moved to the open position, the target element 142 is free to move to the second position, as shown in FIG. 3d. Once in the second position, the arm 56 may be extended to retain the target element 142 in the second position. That is, the retaining mechanism 54 may be employed to retain the second magnetic element 144 in the second position. This may be triggered by initiation of a procedure making use of a device coupled with the connector 130. For example, if a camera is in use, a signal may be transmitted by the connector 130 to the retaining mechanism 54.

Figure 3E:
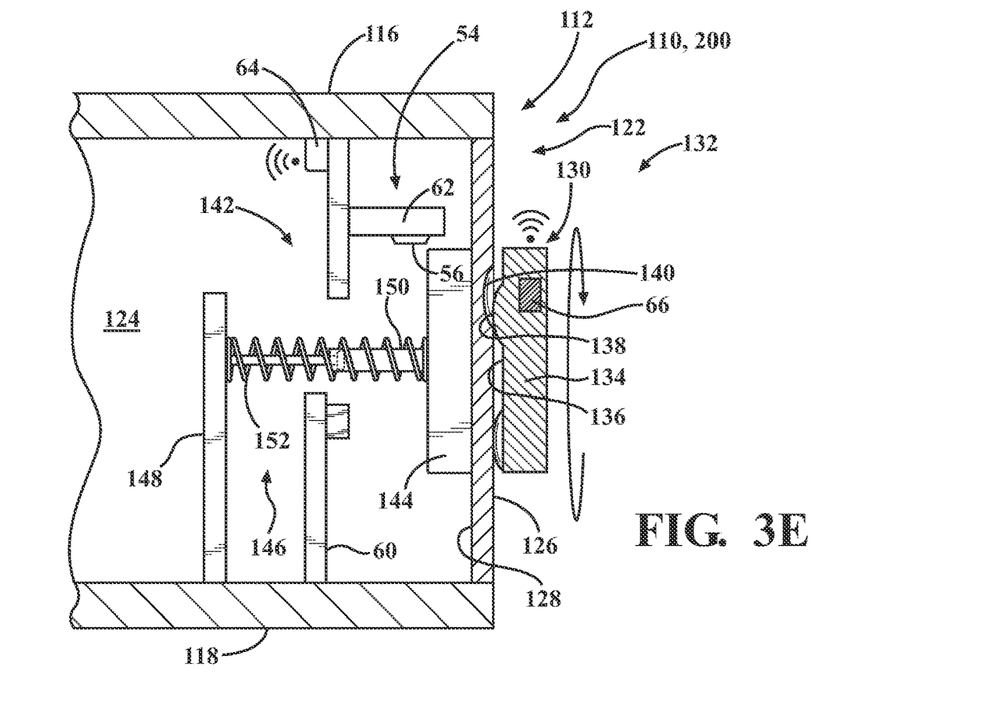
FIG. 3e is a view of FIG. 3d showing the connector rotated.

With reference now to FIG. 3e, the connector 132 is shown rotated relative to FIG. 3d. As such, the force of the magnetic attraction between the first magnetic element 134 and the second magnetic element 144 is reduced making it easier to pull the connector 132 away from the electrical housing 12. The actuator 62 may be configured to move arm 56 into the close position, as shown in FIG. 3a when the target element 42 is in the first position. In one aspect, the actuator 62 may process an absence of a command signal to move the arm 56 to the close position.

Embodiments of the First and the Second Cam Surfaces

Figures 4A, 4B:
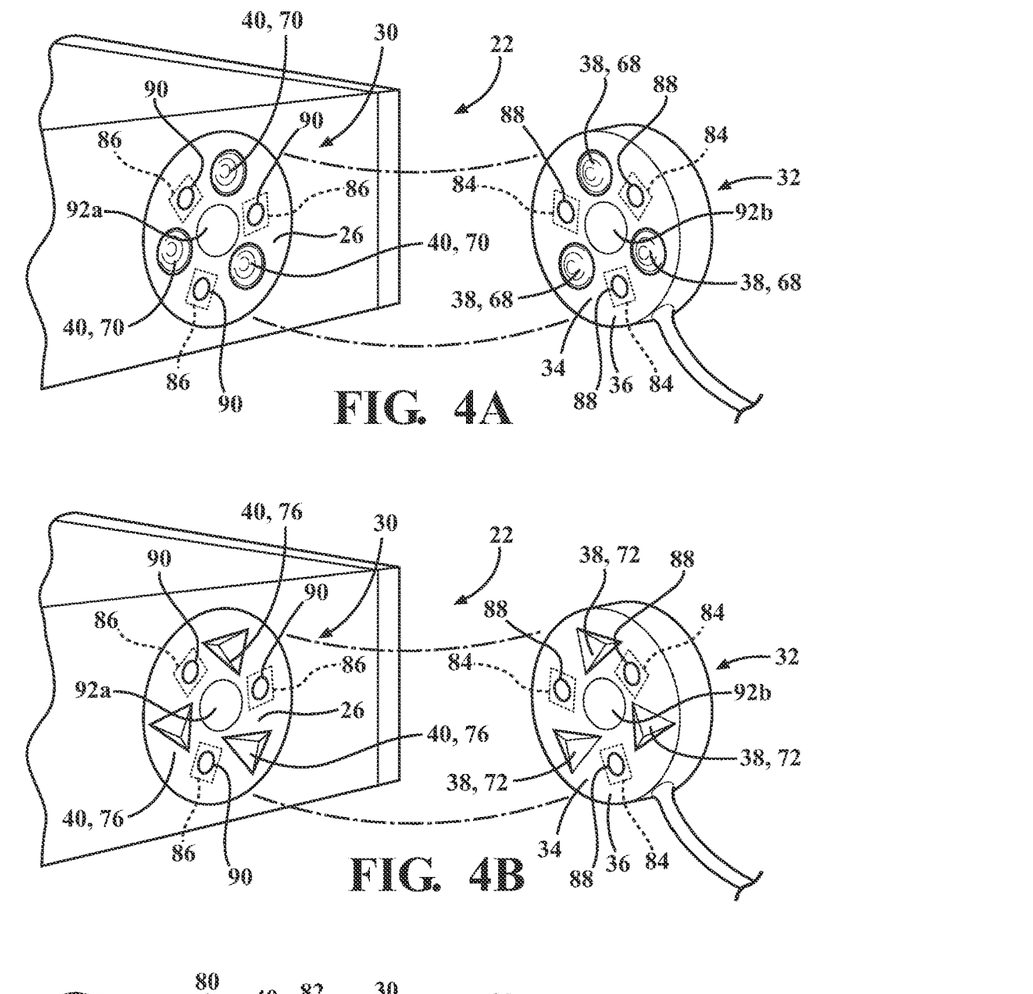
FIG. 4a is a depiction of a first aspect of the first cam surface and the second cam surface.
FIG. 4b is a depiction of a second aspect of the first cam surface and the second cam surface.
Figure 4C:
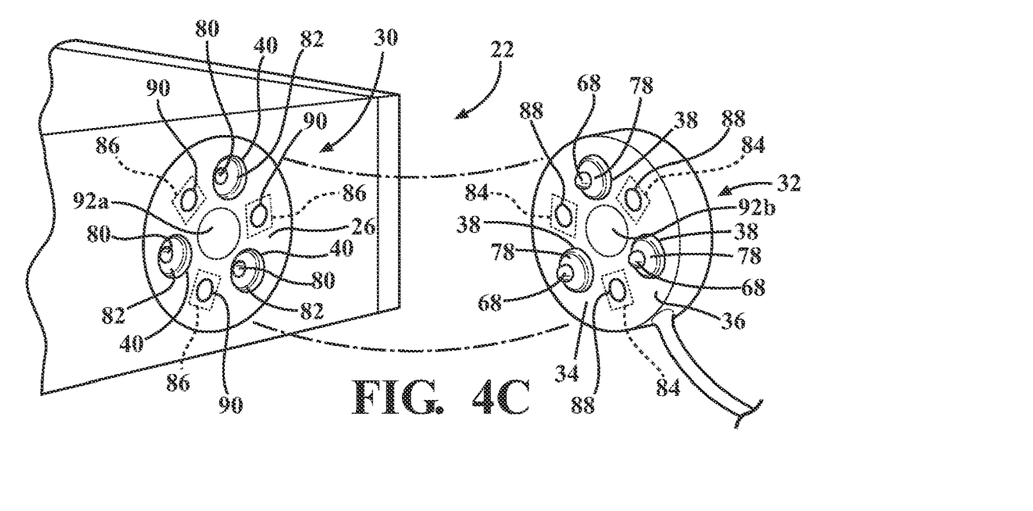
FIG. 4c is a depiction of a third aspect of the first cam surface and the second cam surface.

As stated above, the first cam surface 38 and the second cam surface 40 are configured to translate a rotation of the connector 32 into an axial displacement wherein the connector 32 is moved away from the housing panel 22. With reference now to FIGS. 4a-4c various aspects of the first cam surface 38 and the second cam surface 40 are provided. It should be appreciated that the aspects of the first cam surface 38 and the second cam surface 40 which are described below may be utilized in the first embodiment and the second embodiment described herein.

With reference first to FIG. 4a, the first cam surface 38 is shown as being a bead 68 and the second cam surface 40 is an indent 70 having a shape which is configured to fully receive the bead. In one aspect, the connector 32 includes three (3) first cam surfaces 38 and the outer surface 26 of the housing panel 22 includes three (3) second cam surfaces 40. However, it should be appreciated that the connector 32 and the outer surface 26 of the housing panel 22 may manufactured with a single first cam surface 38 and a single second cam surface 40. Likewise, the cam profile may be continuous with one or more low/high points where each bead 68 and indent 70 is shown. The bead 68 may include a partially spherical profile of a first radius. The indent may include a partially spherical profile of a second radius. The first radius may be the same as the second radius. The first radius may be less than the second radius. Referring back to FIG. 2c, as the connector 32 is rotated, the bead 68 slidingly engages the indent 70. The force required to generate sufficient torque to rotate the connector 32 may be less than the force required to pull the connector 32 axially from the outer surface 26.

With reference now to FIG. 4b, the first cam surface 38 is shown as being a ramp shaped member 72 which is shaped as a triangular pyramid. The second cam surface 40 is an indent 76 that is also ramp shaped so as to be complimentary to the first cam surface 38. As used herein, the term "complimentary shape" refers to a shape which allows the surfaces of the respective first and second cam surfaces 38, 40 to be generally flush against each other when pressed together. In such an aspect, the connector 32 is made to detach from the housing panel 22 by a one-way rotation which is dictated by the complimentary shapes of the first cam surface 38 and the second cam surface 40 and thus a counter-clockwise rotation will displace the connector 32 from the housing panel 22 but a clockwise rotation is prevented by engagement of a back wall of the triangular pyramid with the second cam surface 40. Although a triangular pyramid shape is shown, other one-way rotation shapes are contemplated. For example, returning to FIG. 4a, the bead 68 and indent 70 could include a substantially flat back wall in place of the radiused surface, such as a quarter of a sphere spheroid shape (similar to an orange slice of one quarter size.)

FIG. 4c provides an aspect where the first cam surface 38 is a bead 68 and a ring 78 concentric to the bead 68. The bead 68 has a height greater than a height of the ring 78. The second cam surface 40 is an indent with a complimentary shape. In particular, the second cam surface 40 includes a bead shaped indent 80 having a ring shaped indent 82 concentric to the bead shaped indent 80. In such an aspect, the strength of the magnetic attraction between the first magnetic element 34 and the second magnetic element 44 is reduced in an exponential manner. For instance, a rotation of the connector 32 moves the bead 68 of the first cam surface 38 into the ring shaped indent 82 of the second cam surface 40. A further rotation of the connector 32, places the bead 68 of the first cam surface 38 onto the outer surface 26 of the housing panel 22, wherein the magnetic attraction between the target element 42 and the connector 32 is exponentially smaller relative to the magnetic attraction when the bead 68 of the first cam surface 38 is engaged with the ring shaped indent 82 of the second cam surface 40. In this exemplary embodiment, rotation of the connector 32 relative to the housing panel 22 may be more limited due to the bead 68 projecting higher than the ring 78. That is, the bead 68 may provide improved alignment of additional features of the connector 32 described below.

FIGS. 4a-4c depict an aspect where the first cam surface 38 is a protrusion on the first engagement surface 36 of the connector 32 and the second cam surface 40 is an indent on the outer surface 26 of the housing panel 22. However, it should be appreciated that the first cam surface 38 may be formed to be an indent and the second cam surface 40 may be formed as a protrusions that is complimentary to the indent.

With reference again to FIG. 1 and also to FIGS. 4A-4C, the connector 32 and the interface 30 may be configured to transmit and receive signals wirelessly. For illustrative purposes, a description of such an aspect will be made in the case of the electrical device 10 being a camera controller 200. In such an aspect, the connector 32 is coupled to an endoscope (not shown) having image sensors, such as a complementary metal oxide semiconductor "CMOS" or a charged coupled device "CCD". It should be appreciated that any pixelated image sensor currently known or later developed may be modified and adopted for use herein. In one embodiment, the image sensor is configured to receive electromagnetic radiation in the visible spectrum and also in the infrared range between about 800 nanometers to 1200. Signals from the image sensor are transmitted to the camera controller 200 wirelessly through the connector 32. Likewise, the camera controller 200 may transmits signals to the endoscope, such as a command signal for rotating a camera view and the like, to the endoscope.

The connector 32 includes a first transceiver 84 configured to transmit and receive a wireless signal. The interface 30 includes a second transceiver 86. Although not shown in FIGS. 2a-2e or 3a-3e, the second transceiver 86 may be disposed within or adjacent to the panel 22, 122, or alternately the target plate 44, 144 may include the second transceiver 86. For illustrative purposes, the connector 32 is shown as having three (3) first transceivers 84 and the interface 30 of the housing panel 22 includes three (3) second transceivers 86. Each of the first transceivers 84 and the second transceivers 86 are configured to transmit a signal wirelessly, any such transceiver currently known or later developed may be modified for use herein, illustratively including a device that expands and collimates an optical signal such as expanded beam transceivers or other light transceivers, such as the light transceiver commonly known as a Radian® F-Light transceiver. In such an aspect, each of the first transceiver 84 and the second transceiver 86 are positioned to a corresponding first port 88 and second port 90. The ports 88, 90 are fixed with respect to a corresponding first cam surface 38 and second cam surface 40 such that when the first cam surface 38 is registered to the second cam surface 40, the ports 88, 90 are registered to each other to facilitate the transmission of the optical signal.

In another aspect of an electrical device 10, the electrical device may be configured to provide wireless power from the electrical housing 12 to the connector 32. In such an aspect, the electrical housing 12 includes an inductive power generating device 92*a*. The inductive power generating device 92*a* may include a coil configured to transfer power over a magnetic field. Likewise, the connector 32 includes an inductive power receiving device 92*b*. The inductive power receiving device 92*b* may include a coil configured to wirelessly receive power from the inductive power generating device 92*a*. Any such wireless power systems are currently known or later developed may be adapted for use herein. Preferably, the wireless power systems is configured for near-field wireless transmission. The specifications of such a wireless power system may be in compliance with Qi power standards.

With reference now to FIGS. 1, and 4A-4C, in one aspect, the inductive power generating device 92*a* is shown centered on the outer surface 26 of the interface 30 of the housing panel 22. Specifically, the inductive power generating device 92*a* is centered within the second cam surfaces 40. Likewise, the inductive power receiving device 92*b* is centered within the first cam surfaces 38 so as to be registered with the inductive power generating device 92*a* when the connector 32 is engaged with the interface 30. It should be appreciated that the inductive power generating device 92*a* and the inductive power receiving device 92*b* need not be centered within the corresponding interface 30 and connector 32. However, it is preferable that the inductive power generating device 92*a* and the inductive power receiving device 92*b* are disposed so as to be diametrically opposed to each other when the interface 30 and connector 32 are engaged in order to facilitate a power transfer.

A number of implementations have been described. Nevertheless, it will be understood that various modifications may be made without departing from the spirit and scope of the disclosure. Accordingly, other implementations are within the scope of the following claims.

We claim:

1. An electrical device for transmitting and receiving signals, the electrical device including electrical components for receiving, transmitting and processing the signals, the electrical device comprising:
   a connector having a first magnetic element and a first engagement surface, the first engagement surface including a first cam surface;
   an electrical housing configured to hold the electrical components, the electrical housing having a housing panel with an outer surface configured to receive the connector and an inner surface facing an interior of the electrical housing, the outer surface including a second cam surface configured to engage the first engagement surface and the first cam surface; and
   a target element disposed within the electrical housing, the target element including a second magnetic element, wherein the first cam surface and the second cam surface are configured to translate a rotation between the first cam surface and the second cam surface into an axial displacement of the connector with respect to the housing panel so as to diminish a magnetic attraction between the first magnetic element and the second magnetic element.

2. The electrical device as set forth in claim 1, further including a target positioning member configured to position the second magnetic element between a first position to a second position, wherein in the first position, the second magnetic element is further from the inner surface, and in the second position the second magnetic element is closer to the inner surface relative to the first position, wherein the target positioning member is configured to position the second magnetic element into the first position when the connector is removed from the outer surface and positions the target element into the second position when the first cam surface engages the second cam surface.

3. The electrical device as set forth in claim 2, further including a first mount, the targeting positioning member coupling the first mount to the second magnetic element, the targeting positioning member configured to dampen a movement of the second magnetic element towards the first magnetic element.

4. The electrical device as set forth in claim 3, wherein the target positioning member is a damping device.

5. The electrical device as set forth in claim 4, wherein the damping device is a pneumatic piston having a damping compression value that is lower than a damping rebound value.

6. The electrical device as set forth in claim 2, wherein the target positioning member is a biasing member.

7. The electrical device as set forth in claim 2, further including a retaining mechanism mechanically coupled to the second magnetic element and configured to releasably hold the second magnetic element in the first position.

8. The electrical device as set forth in claim 7, further including an actuator configured to actuate the retaining mechanism between a release position and an engaged position.

9. The electrical device as set forth in claim 8, further including a receiver configured to receive a command signal, the actuator processing the command signal so as to actuate the retaining mechanism.

10. The electrical device as set forth in claim 9, wherein the connector includes a wireless transmitter configured to transmit the command signal.

11. The electrical device as set forth in claim 10, wherein the wireless transmitter is an RFID transmitter, the actuator processing a strength of the command signal to actuate the retaining mechanism into the release position and the engage position.

12. The electrical device as set forth in claim 1, wherein one of the first cam surface and the second cam surface is a bead and the other of the first cam surface and the second cam surface is an indent having a shape complimentary to the bead.

13. The electrical device as set forth in claim 1, wherein one of the first cam surface and the second cam surface is ramp shaped and includes a back wall and the other of the first cam surface and the second cam surface is an indent having a shape complimentary to the first cam surface.

14. The electrical device as set forth in claim 1, wherein one of the first cam surface and the second cam surface is a bead having a ring concentric to the bead and the other of the first cam surface and the second cam surface is an indent having a bead shaped indent and a ring shaped indent concentric to the bead shaped indent that is complimentary to the bead and the ring.

15. The electrical device as set forth in claim 1, wherein one of the first cam surface and the second cam surface is an indent and the other of the first cam surface and the second cam surface is a protrusion.

16. The electrical device as set forth in claim 15, wherein the indent is concave and protrusion is convex.

17. A camera controller for transmitting and receiving signals, the camera controller including electrical components for receiving, transmitting and processing the signals, the camera controller comprising:
- a connector having a first magnetic element and a first engagement surface, the first engagement surface including a first cam surface;
- an electrical housing configured to hold the electrical components, the electrical housing having a housing panel with an outer surface configured to receive the connector and an inner surface facing an interior of the electrical housing, the outer surface including a second cam surface configured to engage the first engagement surface and the first cam surface; and
- a target element disposed within the electrical housing, the target element including a second magnetic element, wherein the first cam surface and the second cam surface and configured to translate a rotation between the first cam surface and the second cam surface into an axial displacement of the connector with respect to the housing panel so as to diminish a magnetic attraction between the first magnetic element and the second magnetic element.

18. The camera controller as set forth in claim 17, further including a target positioning member configured to position the second magnetic element between a first position to a second position, wherein in the first position, the second magnetic element is further from the inner surface, and in the second position the second magnetic element is closer to the inner surface relative to the first position, wherein the target positioning member is configured to position the second magnetic element into the first position when the connector is removed from the outer surface and positions the target element into the second position when the first cam surface engages the second cam surface.

19. The camera controller as set forth in claim 18, wherein the target positioning member is a pneumatic piston having a damping compression value that is lower than a damping rebound value.

20. The camera controller as set forth in claim 19, wherein the target positioning member is a biasing member.

21. The camera controller as set forth in claim 18, further including a retaining mechanism mechanically coupled to the second magnetic element and configured to releasably hold the second magnetic element in the first position.

22. The camera controller as set forth in claim 21, further including an actuator configured to actuate the retaining mechanism between a release position and an engaged position.

23. The camera controller as set forth in claim 22, further including a receiver configured to receive a command signal, the actuator processing the command signal so as to actuate the retaining mechanism.

24. The camera controller as set forth in claim 23, wherein the connector includes a wireless transmitter configured to transmit the command signal.

25. The camera controller as set forth in claim 24, wherein the wireless transmitter is an RFID transmitter, the actuator processing a strength of the command signal to actuate the retaining mechanism into the release position and the engage position.

26. The camera controller as set forth in claim 17, wherein one of the first cam surface and the second cam surface is a bead and the other of the first cam surface and the second cam surface is an indent having a shape complimentary to the bead.

27. The camera controller set forth in claim 17, wherein one of the first cam surface and the second cam surface is ramp shaped and includes a back wall and the other of the first cam surface and the second cam surface is an indent having a shape complimentary to the first cam surface.

28. The camera controller as set forth in claim 17, wherein one of the first cam surface and the second cam surface is a bead having a ring concentric to the bead and the other of the first cam surface and the second cam surface is an indent having a bead shaped indent and a ring shaped indent concentric to the bead shaped indent that is complimentary to the bead and the ring.

29. The camera controller as set forth in claim 17, wherein one of the first cam surface and the second cam surface is an indent and the other of the first cam surface and the second cam surface is a protrusion.

30. The camera controller as set forth in claim 29, wherein the indent is concave and protrusion is convex.

* * * * *